United States Patent [19]

Robins et al.

[11] Patent Number: 4,757,752
[45] Date of Patent: Jul. 19, 1988

[54] TEA BREWING AND DISPENSING APPARATUS

[75] Inventors: Donald T. Robins, Croton, N.Y.; John C. Spruill, Willingboro, N.J.; James R. Weldon, New York, N.Y.; Robert W. Wood, Cranbury, N.J.

[73] Assignee: General Foods Corporation, White Plains, N.Y.

[21] Appl. No.: 942,561

[22] Filed: Dec. 16, 1986

[51] Int. Cl.$^4$ .................................. A47J 31/40
[52] U.S. Cl. ................................. 99/279; 99/307
[58] Field of Search ............... 99/275, 279, 288, 290, 99/300, 302 R, 316, 307, 320, 284, 286, 287, 323.3, 295; 426/433

[56] References Cited

U.S. PATENT DOCUMENTS

| | | | |
|---|---|---|---|
| 3,634,107 | 1/1972 | Cornelius | 99/275 |
| 3,641,918 | 2/1972 | Schellgell | 99/300 |
| 4,309,939 | 1/1982 | Stover | 99/280 |
| 4,363,262 | 12/1982 | Pinckley | 99/290 |
| 4,470,999 | 9/1984 | Carpiac | 99/275 |

Primary Examiner—Robert W. Jenkins
Attorney, Agent, or Firm—Thomas R. Savoie; Daniel J. Donovan

[57] ABSTRACT

A countertop, iced-tea brewing and dispensing apparatus includes means for heating a stream of water that thereafter passes through a bed of tea leaves at a ratio which will produce a beverage concentrate. The concentrate is collected in a reservoir where it is kept at between 120° and 140° F. The heated concentrate is combined with cold water at a ratio of at least four parts water per part concentrate and dispensed into a drinking vessel.

9 Claims, 2 Drawing Sheets

TEA BREWING AND DISPENSING APPARATUS

BACKGROUND OF THE INVENTION

Machines for dispensing tea beverages are known in the art. Typically these dispensing units are intended to supply an amount of ready-to-drink (i.e., single strength) tea beverage to a glass or cup which is filled with ice. The liquid which flows from the dispensing unit is typically at or close to room temperature, since in this manner the expense, both in terms of costs and space, of providing the unit with cooling capacity is eliminated.

Units which furnish a tea beverage as a result of combining soluble tea powder with water or as a result of brewing green or black tea leaves with heated water are both known in the art. As might be expected, beverages prepared from the use of fresh brewed tea extract are considered to be superior in quality to those prepared by merely reconstituting soluble (i.e., instant) tea powder with water. Where countertop space is at a premium, however, the use of the generally-smaller soluble tea beverage dispensers has been preferred. Food service establishments such as restaurants and diners typically have a shortage of countertop space.

An additional factor which has worked against the use of ice tea brewer-dispensers in food services operations is the fact that heretofore such units produced single-strength tea extracts and required either the presence of a large volume reservoir or the necessity to perform many separate brewing cycles. As will be appreciated by those skilled in the art, the capacity of a brewer/dispenser, that is the number of servings of beverage that can be dispensed per brewing cycle, should be relatively large so as to reduce the number of brewing cycles which need to be performed. Each brewing cycle requires filling the brewing basket with tea leaves and then emptying the basket. In the case of countertop brewer/dispensers this is invariably a manual operation.

SUMMARY OF THE INVENTION

This invention relates generally to an apparatus for dispensing a tea beverage which has the flavor and quality of fresh-brewed ice tea.

It is an object of this invention to provide such an apparatus having an operating system which reduces the storage volume required for a given capacity of dispensed beverage.

It is a further object of the present invention to provide a countertop dispensing apparatus for a cold, tea beverage which apparatus has relatively high capacity but which requires relatively little space, as compared to prior devices.

According to the present invention a freshbrewed, concentrated tea solution is prepared by combining in-line heated water and tea leaves in an amount and at ratio to yield from about 2 to 10 liters of a 4 fold or more tea concentrate. This tea concentrate is stored in a relatively small reservoir where it is maintained at a temperature of from 120° to 140° F. The warm concentrate is then, on demand, combined with four parts or more of cold water, prior to or as it is being dispensed from the apparatus and into an ice-containing cup or glass. The dispensed tea beverage is cloud-free and has fresh-brewed flavor.

DESCRIPTION OF THE INVENTION

Figure 1:
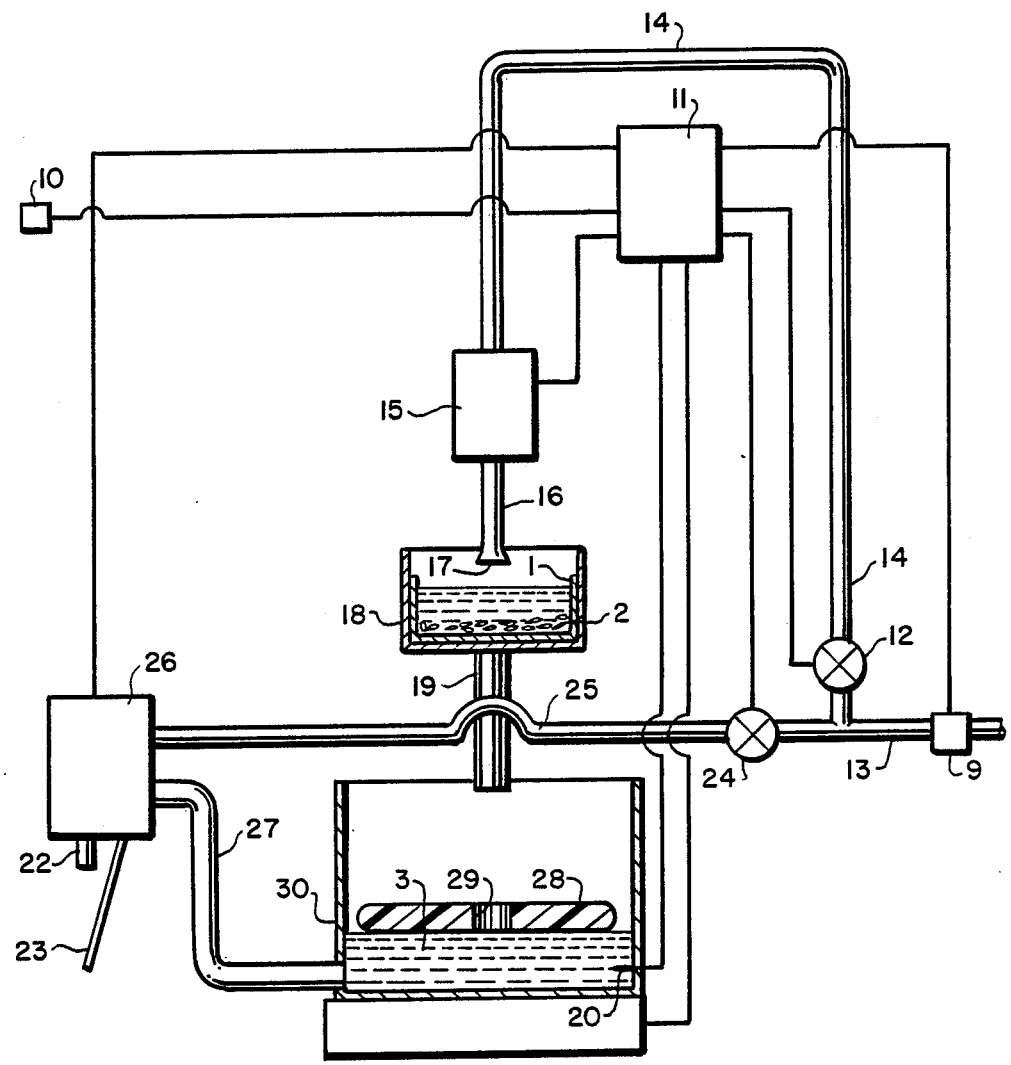
FIG. 1 illustrates a schematic diagram of an apparatus for brewing and dispensing tea in accordance with the principles of this invention.

The apparatus of this invention will hold a small volume (e.g. less than one or two gallons) of concentrated, freshly-brewed tea extract at a temperature of from 120° to 140° F. The concentrate is maintained at this elevated temperature in order to prevent the formation of a cloudy appearance in the concentrate for a period of at least twelve hours.

The heated concentrate is combined with cold (line temperature) water in an on-line mixing valve, such as a venturi valve, at a ratio of at least four parts water per part concentrate. The mixture is dispensed from the mixing valve on demand, usually into an ice-filled cup or container, to yield a high-quality, ice-tea beverage.

An additional feature of the apparatus of this invention is the use of an in-line heater, such as a flash heater, in order to heat the water which is passed onto a bed of tea leaves. The use of an in-line heater, as opposed to a hot water supply system wherein a reservoir of water is heated in bulk and possibly maintained at an elevated temperature until needed, will further contribute to the reduced size of the countertop brewing and dispensing apparatus of this invention. The in-line heater will also be capable of continuously supplying hot water in the event multiple successive brewing cycles are desired.

The operation of the brewing and dispensing apparatus of this invention will now be described having reference to the schematic figures set out in the drawings, where like numbers refer to like elements. The figures depict both the conduits for fluid flow and wires for electrical connections. The operation of the apparatus will be discussed in terms of a brewing cycle and a dispensing cycle which in normal operation will be conducted at different times, but which could be performed at the same time. The figures depict the apparatus at a point during the brew cycle.

The brewing cycle is commenced by supplying a filter and a measured amount of tea leaves to the brew basket and then activating an electrical circuit which calls for a pre-set amount of water to be passed through an in-line heater, such as a flash heater, where the water is heated to a temperature of from 190° to 210° F. (87.8° to 98.9° C.), preferably from about 195° to 205° F. (90.6° to 96.1° C.). Referring to FIG. 1, brew cycle actuation means 10, which could be a button or switch located on the front of the apparatus, sends an electrical signal to a, preferably electronic, control mechanism 11 which in turn opens valve 12 (e.g., solenoid valve) to enable line water to flow through conduits 13 and 14. The water is passed to in-line heater 15 which is preferably controlled so as to operate only during the time period during which water is being passed through the heater. From heater 15 hot water is passed via conduit 16 through spray nozzle or element 17 and onto the bed of tea leaves 2 which are contained in brew basket 18. Pressure regulator 9 is present to assure a constant rate of water flow through conduit 14 (and 25).

Typically, brew basket 18 will be made of metal or plastic and will be lined with a removable and preferably disposable filter element 1, such as filter paper. The brew basket will usually have a handle and will easily removed from and repositioned back into the apparatus. The hot water supplied to the brew basket will be from 20 to 30 parts by weight, typically about 25 parts by weight, for each part by weight of tea contained in the brew basket. Operating within these ratios will produce a concentrated brewed tea which will pass from the bottom of brew basket 18 through conduit 19 to brew reservoir 30. As will be recognized by those skilled in the art about ten percent of the hot water supplied to the brew basket will be sorbed and retained by the tea leaves.

In order to conform to the objects of this invention the brew reservoir will have a volume capacity of less than 3 gallons (11.4 l), preferably less than 2 gallons (7.6 l). Each brew cycle will supply less than about 2.5 gallons (9.5 l), preferably less than about 1.5 gallons (5.7 l) of concentrated tea extract to the reservoir. Concentrate reservoir 30 will preferably be equipped with a low fluid level sensing device 20 which will activate means, such as a light, to signal that a new brewing cycle should be initiated. As shown in the drawings, the tea concentrate 3 in the reservoir is heated by means of a thermostatically-controlled heating platen 21. Contact between the concentrate contained in reservoir 30 and the ambient environment is desirably minimized such as by having an cover or lid 28 which contains an aperture 29 which is aligned with conduit 19 and through which tea concentrate will pass. In this manner the reservoir can be consider to be an essentially closed vessel.

Figure 2:
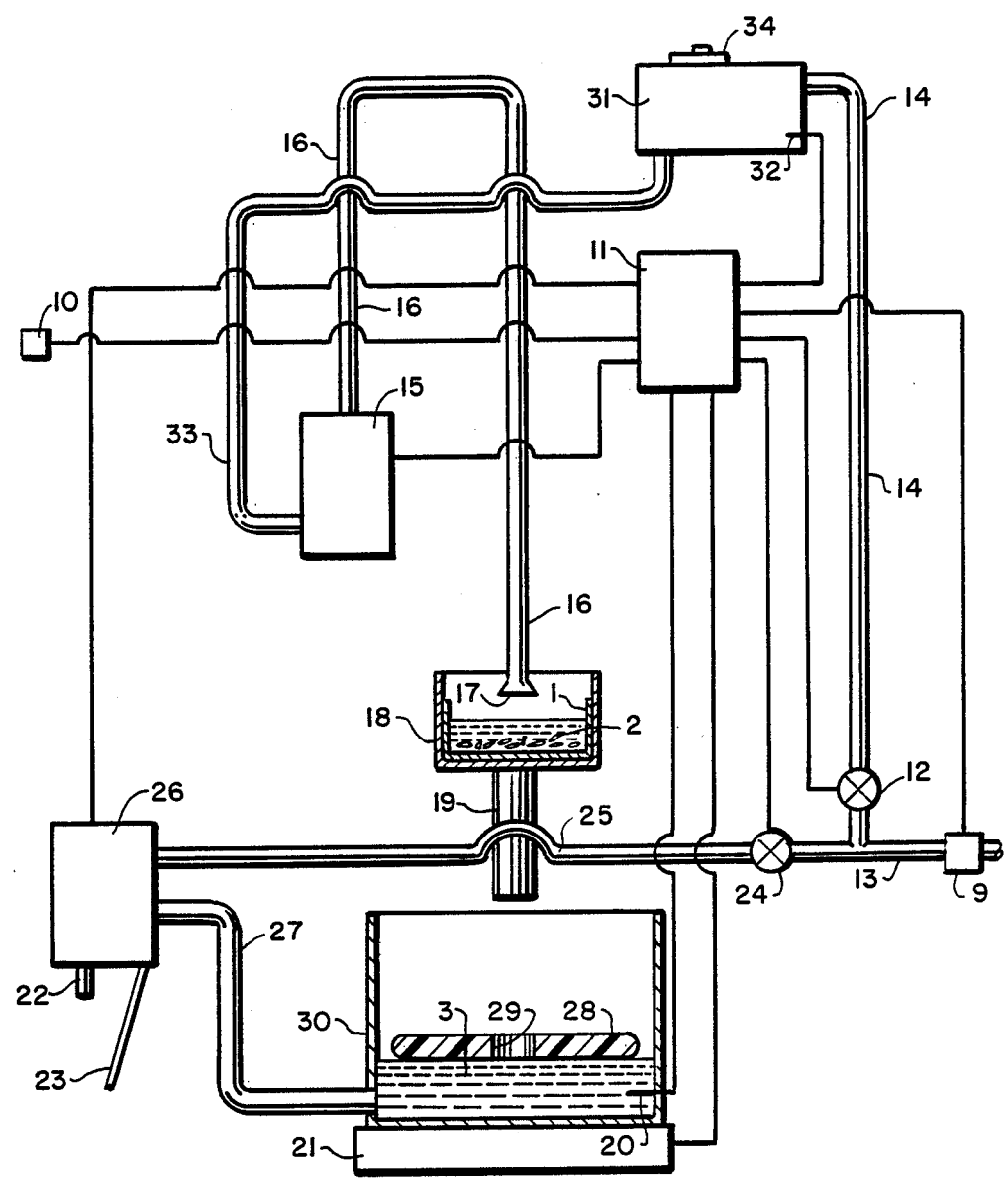
FIG. 2 illustrates a schematic diagram of a preferred embodiment of the apparatus of this invention.

According to an alternative embodiment of the invention as shown in FIG. 2, the apparatus is equipped with a water reservoir 31 located upstream from a flash heater 15. Reservoir 15 is preferably positioned at or near the top of the apparatus. In this embodiment, activation of the brew cycle via activation means 10 would open valve 12 and begin the flow of water to reservoir 15 via line 14. Flow of water into reservoir 31 would be continued for a pre-set time period after which valve 12 would be closed. Reservoir 31 is shown as containing fluid level sensor 32 located near the bottom of the reservoir and which upon sensing a water level will activate flash heater 15. Water is free to flow via gravity to flash heater 15 through conduit 33. Water entering the heater is rapidly heated and will be forced thrugh conduit 16 by means of steam pressure which is generated within heater 15. As will be recognized by those skilled in the art conduit 16 should rise to a height above any possible water level in reservoir 31 so that water will not be forced or siphoned through heater 15.

As the water level in reservoir 32 falls below the level of sensor 32, flash heater 15 may be deactivated; however, residual heat will continue to generate steam within heater 15 to pass essentially all water from conduit 33 through conduit 16 and spray nozzle 17, As an additional feature, when a water reservoir is present on the unit, access to the reservoir may 5 be provided by means of a removable lid 34. The operator could then manually pour a desired amount of water into the reservoir. In this manner, it would be possible to prepare a lesser quantity of brewed concentrate than would be produced using the automatic brew cycle. Of course the operator would supply a proportionately smaller amount of tea leaves to the brew basket to compensate for a lower volume of water.

The dispensing cycle will be described in terms of a flow mechanism which dispenses single-strength tea beverage from outlet 22 during the period a circuit is activated by a mechanical force, such as needed to depress a button or pivot a lever. A button would typically be one which would be depressed by a finger of the operator. A lever such as shown at 23 would be usually pivoted by pushing the lever with the receptacle which is to receive the tea beverage. Alternatively a pressure-sensitive switch could be employed, if a non-electrical dispensing valve was desired.

In operation, when pivoting of lever 23 activates or opens valve 24 permits flow of water through conduct 25 to mixing head or valve 26. In the case of a venturi mixing valve, tea concentrate will be drawn from reservoir 19 through conduit 27 and into mixing valve 26. Water and concentrate are combined in valve 26 at a ratio of about more than 4:1, typically about 5:1.

As will be recognized by those skilled in the art, other known systems for metering and mixing water and a liquid concentrate may be employed. Also, as would be the desire for vending machines, the length of the dispensing cycle could be controlled by a timer or flow meter such that each time the dispensing circuit is activated, a constant amount of tea beverage flows from the apparatus.

According to a preferred embodiment of this invention, reservoir 19 is a straight-walled vessel, usually being rectangular or cyclindrical in cross-sectional shape. Such a vessel is suitable for use with a bouyant lid 28 which is designed to float on the surface of the tea concentrate contained in the vessel. Such a lid is desirable to retain volatile aromatic in the heated tea concentrate, to minimize contact between ambient oxygen and the tea concentrate and to retain heat within the reservoir thereby reducing the energy requirements of the apparatus. Floating lid 28 would typically be made of glass or inert plastic and be sized so as to cover the vast majority of the tea concentrate surface but be free to move vertically within straight-walled reservoir 19. The lid 28 may also contain a center aperture 29 through which the brewed concentrate will pass.

Having thus described the invention what is claimed is:

1. A countertop tea brewing and cold beverage dispensing apparatus comprised of:
   (a) means to supply heated brewing water to a bed of tea leaves, said means including an in-line heater which will heat the water to a temperature between about 190° and 210° F.;
   (b) a brewing basket for holding and retaining the bed of tea leaves and for producing a concentrated beverage extract;
   (c) reservoir means for collecting and holding the beverage concentrate which flows from the brewing basket;
   (d) heating means to maintain the temperature of the beverage concentrate within the reservoir at between about 120° and 140° F.;
   (e) dispensing means including means for combining cold water and heated beverage concentrate at a ratio of at least 4:1 and means for intermittently dispensing a single-strength high quality, cold beverage from the apparatus.

2. The apparatus of claim 1 wherein the fluid capacity of the reservoir is less than three gallons.

3. The apparatus of claim 1 wherein the fluid capacity of the reservoir is less than two gallons.

4. The apparatus of claim 1 wherein the reservoir is a straight-walled vessel.

5. The apparatus of claim 4 wherein the surface of beverage concentrate contained in the reservoir is covered by a floating lid.

6. The apparatus of claim 1 wherein the means for combining cold water and heated beverage concentrate is a venturi mixing valve.

7. The apparatus of claim 1 wherein the reservoir is an essentially closed container.

8. The apparatus of claim 1 wherein a reservoir for the brewing water is positioned at or near the top of the apparatus such that brewing water flows via gravity from the reservoir to the in-line heater and steam pressure within the in-line heater forces the brewing water through a conduit which rises to a height above any possible water level in the reservoir.

9. The apparatus of claim 8 wherein the reservoir has a removable lid to permit manual pouring of water into the reservoir.

* * * * *